(12) United States Patent
Kolz et al.

(10) Patent No.: US 7,991,760 B2
(45) Date of Patent: Aug. 2, 2011

(54) CONSTRUCTING A DOMAIN-SPECIFIC ONTOLOGY BY MINING THE WEB

(75) Inventors: Daniel Paul Kolz, Rochester, MN (US); Kyong Jin Shim, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/028,197

(22) Filed: Feb. 8, 2008

(65) Prior Publication Data
US 2009/0204576 A1 Aug. 13, 2009

(51) Int. Cl.
*G06F 17/30* (2006.01)

(52) U.S. Cl. ........ 707/708; 707/706; 707/707; 707/711; 707/712; 707/713; 707/722; 707/736; 707/758; 707/781; 707/791; 707/802; 704/4; 704/9; 800/260; 706/45; 705/10

(58) Field of Classification Search ........... 707/706, 707/707, 708, 711, 712, 713, 722, 736, 758, 707/781, 791, 802, 999.002, 999.003, 999.007, 707/999.1; 704/4, 9; 800/260; 706/45; 705/10
See application file for complete search history.

(56) References Cited

U.S. PATENT DOCUMENTS

| 6,704,698 | B1 | 3/2004 | Paulsen, Jr. et al. |
| 7,542,969 | B1 * | 6/2009 | Rappaport et al. ........... 1/1 |
| 2006/0047632 | A1 * | 3/2006 | Zhang ..................... 707/3 |
| 2007/0233808 | A1 * | 10/2007 | Egnor et al. ............. 709/217 |

* cited by examiner

*Primary Examiner* — Syling Yen
(74) *Attorney, Agent, or Firm* — Wood, Herron & Evans, LLP (57) ABSTRACT

A method, apparatus, and program product is provided for constructing a domain-specific ontology for interpreting a policy. A phrase assumed to be associated with a policy is received. An indefinite term in the phrase is identified. Internet searches are performed on a plurality of terms from the phrase. A plurality of potential replacement terms is extracted from the Internet search results for the indefinite term. A context-specific ontology is built for the indefinite term based upon tracked occurrences of the plurality of potential replacement terms. The policy is interpreted by accessing the domain-specific ontology to interpret the indefinite term, where the indefinite term is interpreted by mapping the indefinite term to a plurality of potential replacement terms in the ontology for a plurality of contexts, and creating a policy based upon the interpretation of the indefinite term from the ontology.

11 Claims, 7 Drawing Sheets

120 {
1. The Easy Way for Managers and HR Professionals to Handle Personnel ... (PDF)
   Personnel Tasks, and Gather and Access Employee Data ... performance reviews and assign managers to employees. Authorized personnel also can ...
   www.sssi.net/company/downloads/hr.pdf - 91k - View as html 122 {
2. Electronic Learning System - Data Base
   B. The data collected from the employees include: employee's name, extension, ... Managers from IRS can access an IRS employee's training history records from ...
   www.irs.gov/privacy/article/0,,id=130936,00.html - 17k - Cached 124 {
3. Sage Abra Employee Self-Service - Secure Personal Data Access
   Abra ESS provides a central location for employees, managers, and administrators to view and manage important personal data and company information.
   www.blytheco.com/abra/abra_employee.asp - 51k - Cached 126 {
4. PRO/DATA - Human Resource and Payroll Solutions
   ... DATA's Employee Self-Service feature empowers any employee with internet access ... managers are better able to make informed decisions based on direct access to ...
   www.prodataontheweb.com/hr_main.html - 25k - Cached 128 {
5. The MIT HR-Payroll Project
   A policy currently exists that employees do not "own" their voicemail or email therefore, a (manager) can access an (employees' voicemail or email) if necessary ...
   web.mit.edu/is/delivery/hrpayroll/scorecard_exit.html - 15k - Cached

CONSTRUCTING A DOMAIN-SPECIFIC ONTOLOGY BY MINING THE WEB

FIELD OF THE INVENTION

The present invention generally relates to computers and data processing, and more particularly, to constructing an ontology from data available on the Internet.

BACKGROUND OF THE INVENTION

Policy management is a multi-step process. For example, the process for management of a security policy involves defining, review, validating, verifying, approving, modifying, retrieving, removing, and enforcing security policies. Not only that, a security policy has many components and points of enforcement because a company's security policies are generally tied to the company's specific business requirements and policies. One component of a desirable security policy solution concerns assisting IT personnel in their efforts to define security policies in computing environments in a cost-effective and intuitive manner. The company's security policies are generally in written form in electronic or paper documents, and the IT personnel would need to map these written descriptions into a form compatible with the computing environment.

For example, IT personnel may wish to extract a set of security policies from a human-readable document that may be directly or indirectly associated with a security policy. The document, for example, may contain a number of sentences such as:

"John Doe recently moved to Human Resources Department"

"In this meeting, we want to discuss our plans for the third quarter."

"John Doe can read employee hiring information."

"Managers can access employee salary information."

"Jane Doe is not working part-time."

From the text, the IT personnel may find two sentences of interest and more directly related to a company security policy: "John Doe can read employee hiring information." and "Managers can access employee salary information." The IT personnel may now wish to transform these two sentences into one or more security policies by which the computing platforms of their respective department(s) can perform appropriate actions. The first sentence, "John Doe can read employee hiring information," presents little problem in transforming the sentence into a security policy because the meaning of the sentence is fairly straightforward. In other words, it is easy to identify all the components (Subject, Action, Resource) that can be directly mapped to certain entities within the computing platforms. For this first sentence, the subject is "John Doe", the action is "read", and the resource is "employee hiring information." Relationships may then be set up within the computing environment giving John Doe read access to the resources containing employee hiring information.

The second sentence, "Managers can access employee salary information," presents more of a challenge to the IT personnel because the meaning of "access" is too broad. Part of the challenge is that the word "access" cannot be directly mapped to entities within the computing environment. "Access" could mean "read", "write", "execute", and/or other actions. Assumptions may be made to the meaning of the word, e.g., the word "access" may mean "write". If, however, such a substitution does not make sense in the context of the given sentence, it is a poor assumption and therefore not a correct substitution.

One method of determining a meaning of a word in a particular context is to utilize an ontology. A domain ontology (or domain-specific ontology), for example, models a specific domain, or part of the world. It represents the particular meanings of terms as they apply to that domain. For example the word "card" has many different meanings. An ontology about the domain of poker would likely model the "playing card" meaning of the word, while an ontology about the domain of computer hardware might model the "punch card" or the "video card" meanings.

Domain ontologies may be a useful tool for assisting IT personnel in determining meanings of words such as with the word "access" in the example above. However, IT personnel are still challenged with the task of constructing the ontology.

What is needed therefore is an automated method for constructing a domain specific ontology that can be utilized for interpreting and implementing security policies.

SUMMARY OF THE INVENTION

Embodiments of the invention provide a method, apparatus and program product for constructing a domain-specific ontology, which may be used for interpreting a policy, which may, in some embodiments, be a security policy. A phrase assumed to be associated with a policy is received and an indefinite term in the phrase is identified. A first Internet search is performed on a plurality of terms from the phrase to generate first search results. A plurality of clues is extracted from the first search results associated with potential definitions of the indefinite term. A second Internet search is performed incorporating the plurality of clues to generate second search results. A plurality of potential replacement terms for the indefinite term is extracted from the second search results. Occurrences of each of the plurality of potential replacement terms is tracked in the second search results. A context-specific ontology may then be built for the indefinite term based upon the tracked occurrences of the plurality of potential replacement terms.

The plurality of terms, including derivatives of the terms, from the phrase may be supplied to an Internet search engine for the first Internet search. In some embodiments, the Internet search engine is a public search engine. The first search results may then be restricted to a domain of interest by removing hits received from the first Internet search from the first search results that are unrelated to the domain of interest.

In some embodiments, a policy may be interpreted by receiving a phrase assumed to be associated with a policy, identifying a component of the policy in the phrase and identifying an indefinite term in the component of the policy. A domain-specific ontology is accessed to interpret the indefinite term by mapping the indefinite term to a plurality of potential replacement terms in the ontology for a plurality of contexts. A policy may then be created based upon the interpretation of the indefinite term from the ontology. The unknown term may be interpreted by using the domain-specific ontology to statistically determine a plurality of terms to which the indefinite term can map in a particular context. Probabilities associated with each of the plurality of terms may be evaluated and one or more terms from the plurality of terms may then be selected based upon the probability.

In some embodiments, the components of the policy include a subject, an action, and a resource. The domain-specific ontology may be accessed by checking the context of the indefinite term and returning one or more terms from the domain-specific ontology that map to the indefinite term. If the indefinite term is not in the context of the domain-specific ontology, the domain-specific ontology is expanded to include ontology in a given context.

In some embodiments the domain-specific ontology may be expanded by performing a first Internet search on a plurality of terms from the phrase to generate first search results and extracting from the first search results a plurality of clues associated with potential definitions of the indefinite term. A second Internet search is performed incorporating the plurality of clues to generate second search results. A plurality of potential replacement terms of the indefinite term is extracted from the second search results. Occurrences of each of the plurality of potential replacement terms is tracked in the second search results. The context-specific ontology may then be updated for the indefinite term based upon the tracked occurrences of the plurality of potential replacement terms. Embodiments may restrict the first search results to a domain of interest by removing hits received from the first Internet search from the first search results that are unrelated to the domain of interest.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments of the present invention provide a method, apparatus, and program product for automatically constructing a domain-specific ontology for interpreting a policy by searching the Internet. The policy is interpreted by accessing the domain-specific ontology constructed from the Internet searches to interpret indefinite terms in the policy.

Figure 1:
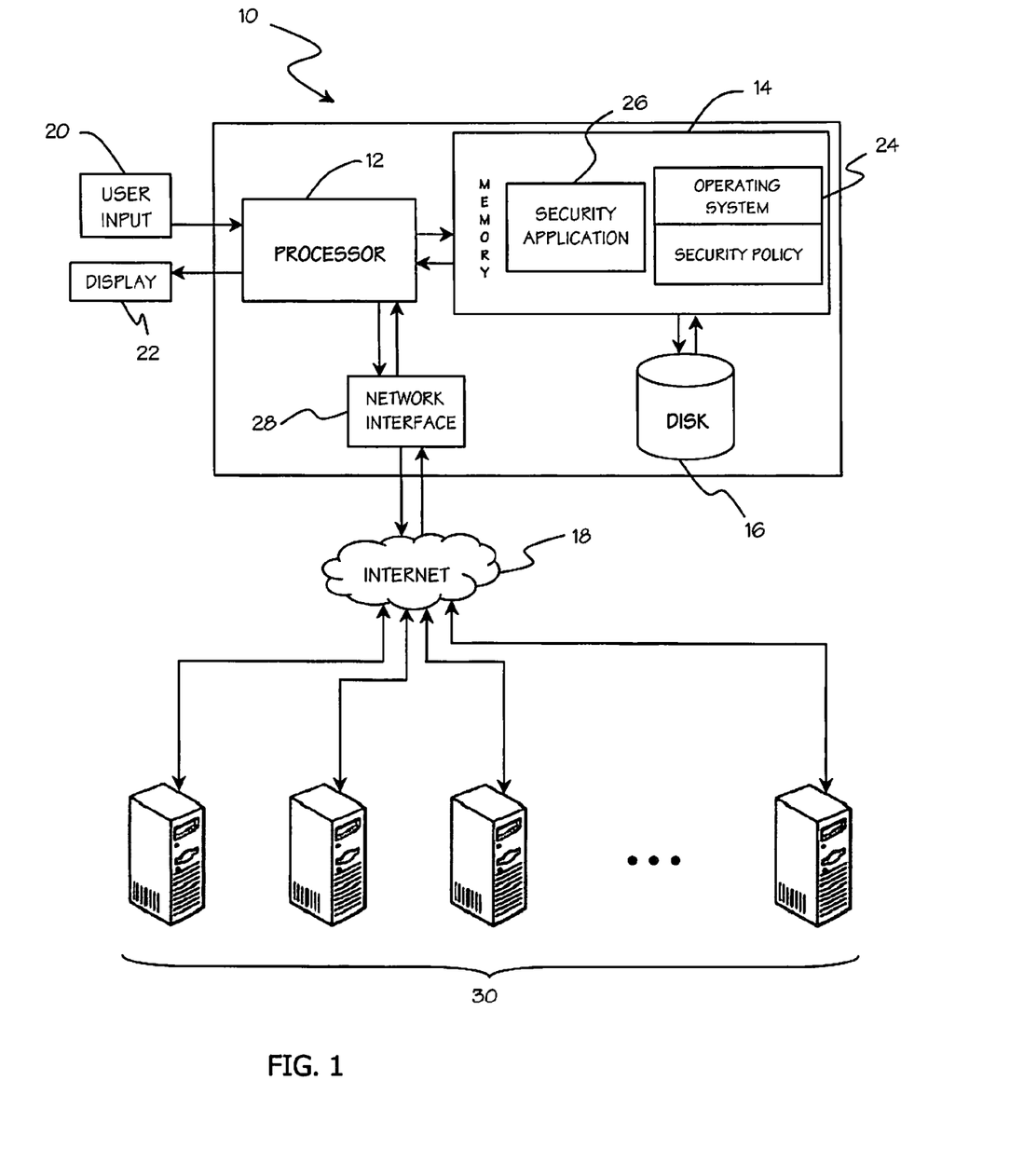
FIG. 1 is a block diagram of an exemplary hardware and software environment for a computer suitable for constructing domain specific ontologies by mining the Internet consistent with embodiments of the invention.

Turning to the drawings, wherein like numbers denote like parts throughout the several views, FIG. 1 illustrates an exemplary hardware and software environment for an apparatus 10. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices, such as routers or firewalls.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18.

Computer 10 also typically receives a number of inputs and outputs for communicating information externally. For interface with a user or operator, computer 10 typically includes one or more user input devices 20 (e.g., a keyboard, a mouse, a trackball, a joystick, a touchpad, a keypad, a stylus, and/or a microphone, among others). Computer 10 may also include a display 22 (e.g., a CRT monitor, an LCD display panel, and/or a speaker, among others). The interface to computer 10 may also be through an external terminal connected directly or remotely to computer 10, or through another computer communicating with computer 10 via a network 18, modem, or other type of communications device.

Computer 10 operates under the control of an operating system 24, and executes or otherwise relies upon various computer software applications, components, programs, objects, modules, data structures, etc. (e.g., security application 26) collectively referred to as "objects". Computer 10 communicates on the network 18 through a network interface 28 to communicate with web servers 30 accessible via the Internet, for example, for searching and retrieving information associated with a policy such as a security policy.

In general, the routines executed to implement the embodiments of the invention, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

The Internet and the World Wide Web, in particular, provide a vast resource of information, which can be tapped to assist in interpreting a sentence containing a policy such as a security policy. For example and referring now to the flow chart in FIG. 2, an arbitrary English sentence that is assumed to be a security policy is supplied by the user in block 50. A security policy may consist of a subject (manager, administrator, accountant, etc.), an action (read, write, execute, etc.), and a resource (employee salary data, human resources files, etc.), so the sentence is broken down into a subject, action and resource in block 52. A check is made on the subject, action, and resource to determine if there are any indefinite terms in decision block 54. If there are indefinite terms ("yes" branch of decision block 56) then a check is made to determine if a domain specific ontology exists that may be used to define the term in decision block 56. If an ontology does not exist ("no" branch of decision block 56), then an ontology is constructed by mining the World Wide Web in block 58. If an ontology does exist for the term ("yes" branch of decision block 56), then a check is made to determine if the term exists within a given context in decision block 60. If the term does not exist in the ontology within the given context ("no" branch of decision block 60), then the ontology is expanded by mining the World Wide Web in block 62.

Figure 2:
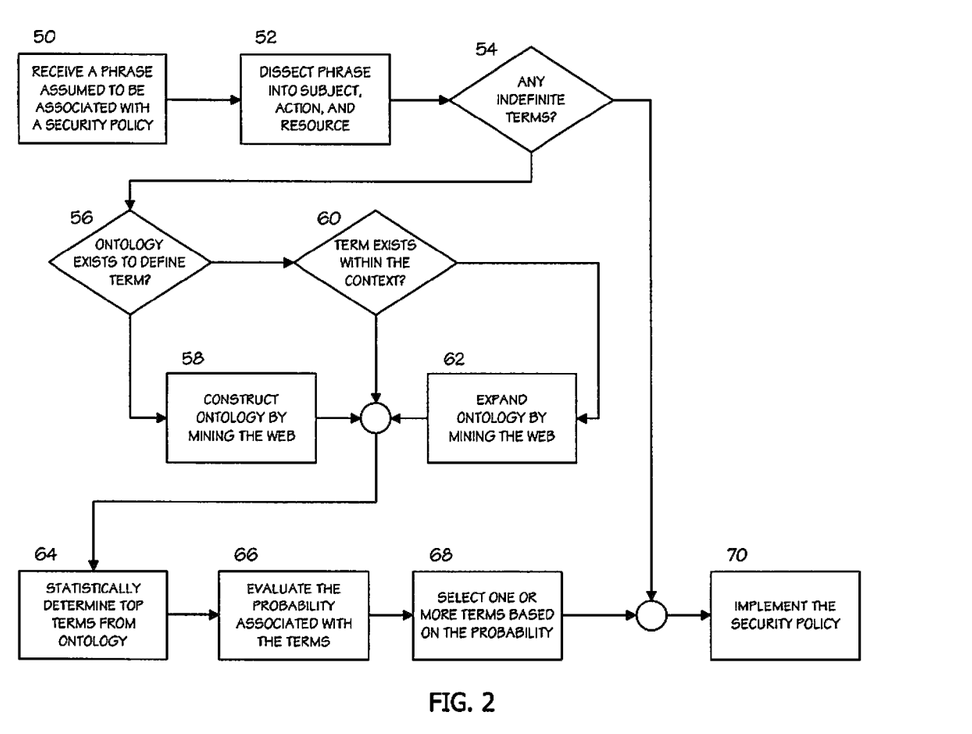
FIG. 2 is a flowchart illustrating a process for interpreting terms using a domain specific ontology.

Once the term has been associated with a domain specific ontology, the top terms from the ontology are statistically determined in block 64. Probabilities associated with the top terms may be evaluated in block 66 and one or more terms may then be selected based on the probability in block 68. The security policy is then implemented in block 70 by substituting the selected top terms for the indefinite term.

Figure 3:
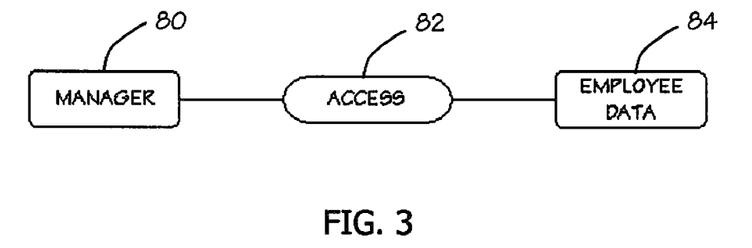
FIG. 3 is a diagram illustrating key terms to be interpreted in the process of FIG. 2.
Figure 4:
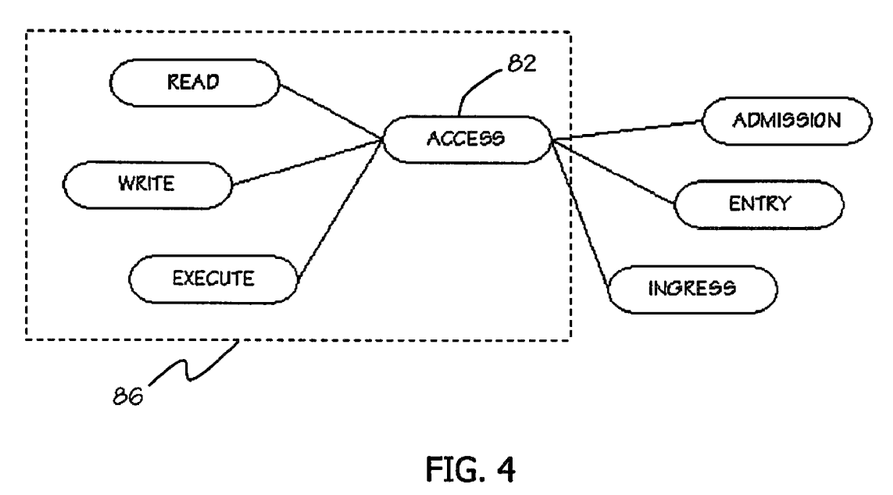
FIG. 4 is a diagram illustrating potential replacement terms for a term in FIG. 3.

Referring now to FIG. 3 and providing additional detail, assume an English sentence, similar to the example above, is supplied to IT personnel as follows: "Managers can access employee data." As described above, the sentence may be dissected in the following manner, Subject: "Managers" 80, Action: "access" 82, and Resource: "employee data" 84. A dictionary within a computing environment is consulted to determine if "access" is understood. After consulting the dictionary, it may be determined that the term "access" is not specific enough or the term "access" does not exist in the dictionary. IT personnel would have an interest in finding other terms that are related to "access" for this policy, though the related words should be within the context of a computing environment and security. For example, as seen in FIG. 4, many words may be related to "access" 82, such as "read", "write", "execute", "admission", "entry", "ingress". Of these words, the group 86 would be related to a computing environment, and other words would be discarded. While the IT personnel would know that the group 86 of related words works in a computing environment, it is still unknown as to how "access" 82 relates to the security policy.

Figure 5:
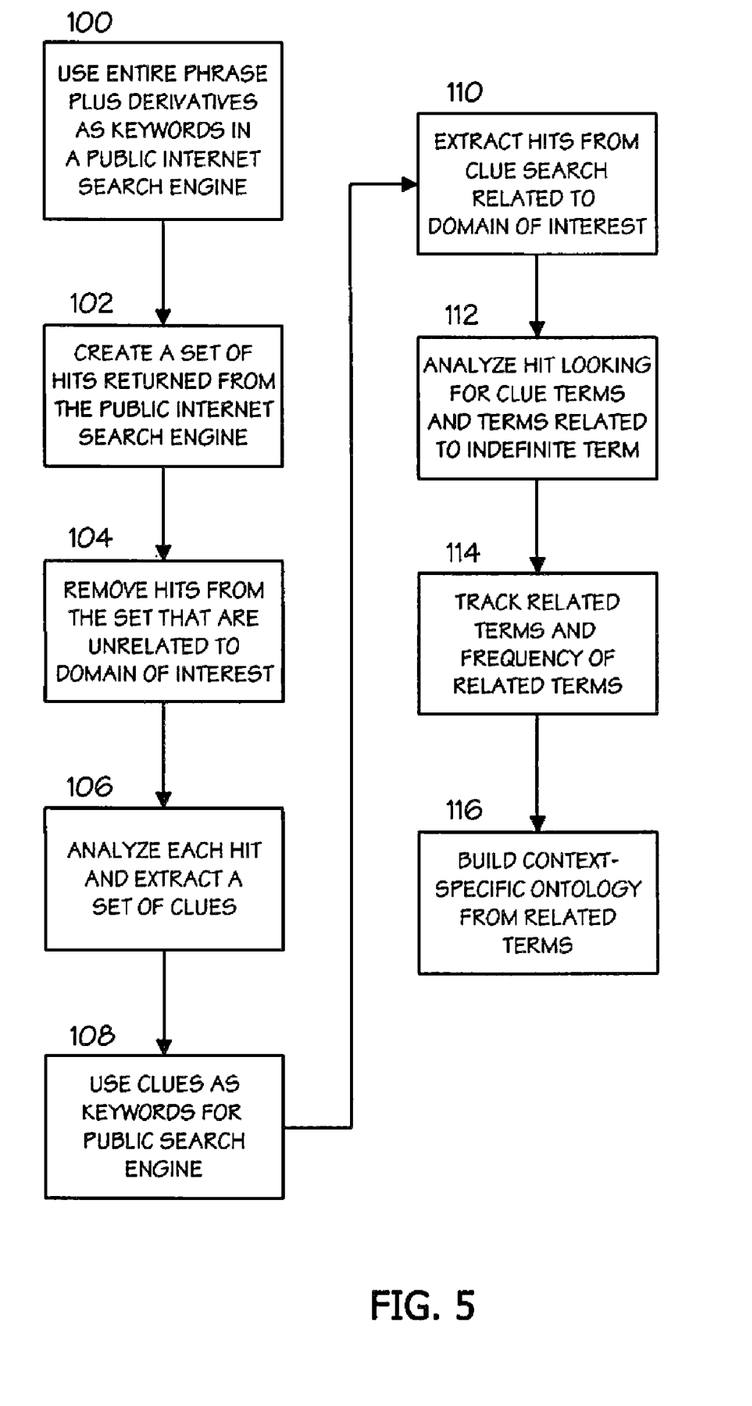
FIG. 5 is a flowchart illustrating a process or creating the domain specific ontologies referenced in FIG. 2.

To further define "access", and referring to the flowchart in FIG. 5, the entire sentence "Managers can access employee data." as well as variations of each term in the sentence is supplied as keywords to a public Internet search engines such as Google™, Yahoo®, MSN®, etc., to perform a search in block 100. For example, the following derivations of the sentence may be used as well: "Managers accesses employee data.", "Managers accessed employee data.", "Managers accessing employee data.", and "Managers accessible employee data."

The public search engine, for example, may return M number of hits. A set H is defined to be the set of hits obtained from the public search engine in block 102:

$H=\{h_1, h_2, \ldots, h_N\}$, where $h_i$ is a hit.

In block 104, hits in set H that are un-related to the domain of interest (e.g., security) may be removed. Hits to be removed may be determined by setting a window size to be X and with X number of neighboring words around the terms of interest (manager, access, employee data), if at least Y number of words appear to be related to the domain of interest, then this hit is retained. Otherwise, the hit is removed from set H. Words that appear to be related to the domain of interest are assumed to already exist in a dictionary of words that are related to the domain of interest. Additionally, if a particular domain is encountered (e.g., www.securitypolicy.org) that would be a good candidate to include, the domain itself may be used as a measure to determine whether to include or exclude a certain hit. What is left is a set whose size is equal to or smaller than set H. Let N be the number of hits that are related to the domain of interest. The set H' is defined as containing the hits from H that have been retained:

$H'=\{h_{22}, h_{128}, \ldots, h_N\}$, where $h_i$ is a hit that is related to the domain of interest.

Each hit in H' is analyzed in block 106. Each $h_i$ generally consists of a webpage having text and/or images, an example of which can be seen in FIG. 6. For this embodiment, only the text of the web pages is analyzed, though analysis may be extended to images and other graphical data for other embodiments. Each $h_i$ may contain one or more sentences (120-128 in FIG. 6)

Figure 6:
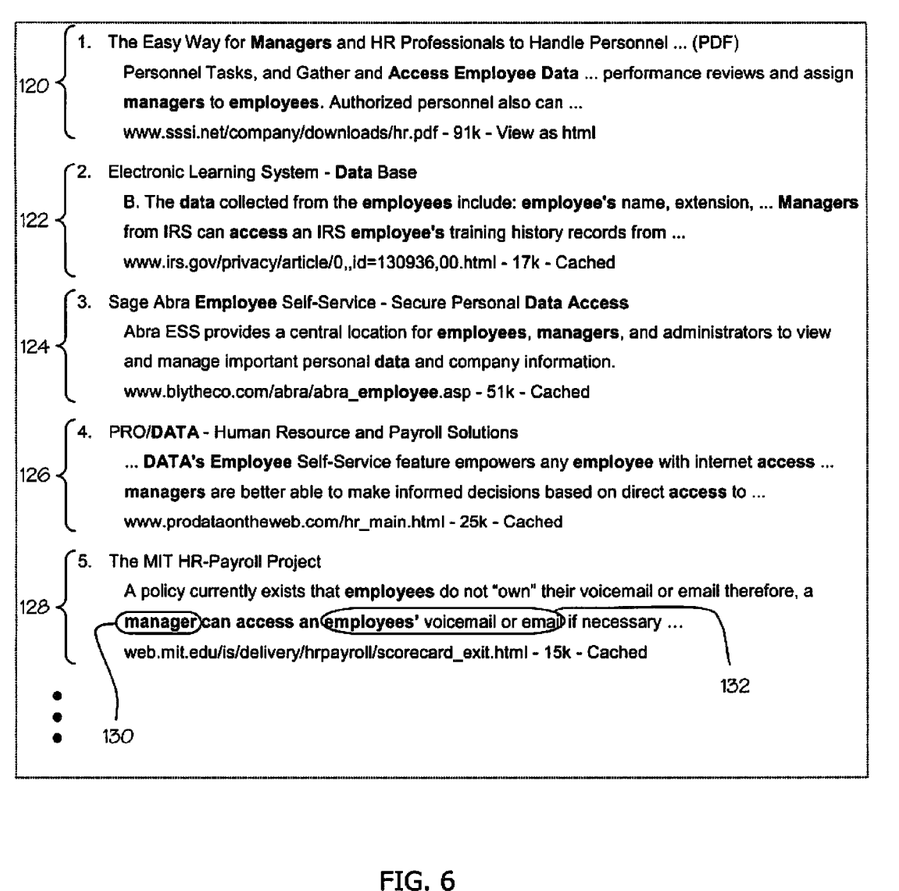
FIG. 6 is an exemplary representation of search results returned from a public internet search engine used in the process in FIG. 5.

Sentence 128 is one of the hits from the Internet search performed earlier. This sentence 128 is a payroll-related webpage. The third line of the sentence 128 reads "manager can access an employees' voicemail or email if necessary". From the above webpage, a clue is extracted. A clue is a set consisting of clue components. Set C is defined to be a set of clue components:

$C=\{C_1, C_2, \ldots, C_T\}$, where $c_i$ is a clue component and T is the number of clue components.

For the above hit, clue components are "manager" 130, "employees' voicemail or email" 132. The clue set for this hit is defined to be C=(manager, employees' voicemail or email). This step is repeated for each hit in the set H' and obtaining one or more clues for each hit. Set Z is defined to be the set of clues:

$Z=\{z_1, z_2, \ldots, z_M\}$, where $z_i$ is a clue and M is the number of clues.

Referring again to FIG. 5, the clues may be used in a second Internet search to find action terms that are related to the action term of interest. For this example, the IT personnel would want to be able to find action terms that are related to the action term "access". In doing so, the clues and their clue components are utilized. Given these sets, $H'=\{h_{22}, h_{128}, \ldots, h_N\}$, where $h_i$ is a hit that is related to our domain of interest.

$C=\{c_1, c_2, \ldots, c_T\}$, where $c_i$ is a clue component $Z=\{z_1, z_2, \ldots, z_M\}$, where $z_i$ is a clue the following steps may be performed in some embodiments for each of the clue components. The World Wide Web is searched using the clue components in block 108. For example, search "manager" AND "employees' voicemail and email". Double quotation marks may be used to maintain the word order if a clue component consists of more than one word. Hits are extracted from the search and hits that are unrelated to the domain of interest are removed in block 110. In block 112 and for each hit, sentences are identified from the search results where the clue components occur and where an action term occurs together with the clue components. This action term is deemed related to the action term of interest and is added to a set R:

$R=\{r_1, r_2, \ldots, r_F\}$, where $r_i$ is an action term that is related to the action term of interest, and E is the number of related action terms.

The terms and the frequency of appearance of each related action term is tracked in block 114. Set V is defined to be a set of counters for the action terms in set R:

$V=\{v_1, v_2, \ldots, v_E\}$, where $v_i$ is an integer representing the frequency of action term $r_i$.

The process described above then returns the two sets R and V. Using the above example, the sets R and V may contain, for example, the following information:

R={"read", "write", "execute"), V={400, 90, 10}.

As a substitution word for the action term "access", the word "read" occurs 400 times, "write" 90 times, and "execute" 10 times. Given a set of security related hits from the Internet search, the word "read" occurs 80% of the time, "write" 18% of the time, and "execute" 2% of the time. The terms "read", "write", and "execute" are all terms that exist in the dictionary associated with the computing environment and each term may be mapped directly to entities within the computing environment. Hence, for the given English sentence, "Managers can access employee data," a domain specific ontology may be constructed in block 116 and as illustrated in FIG. 7.

Figure 7:
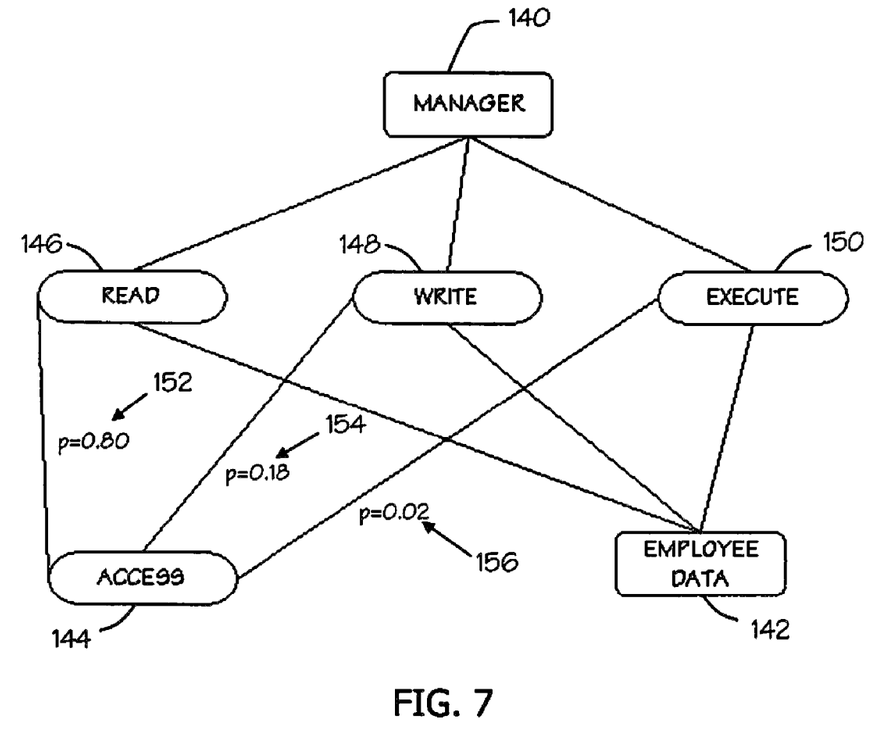
FIG. 7 is a diagram illustrating an ontology created with the process in FIG. 5.

Referring to the ontology in FIG. 7, Subject 140 and Resource 142 are shown in an oblong box, Action 144 and its equivalent terms 146-150 are shown in oval boxes. The equivalent terms 146-150 do exist in the dictionary and are hence referred to as domestic terms. Terms that are not in the dictionary, such as the action term "access", are referred to as foreign terms. Foreign terms cannot be directly mapped to entities in the computing environment. In an ontology, foreign terms are connected to one or more domestic terms in order for them to be understood by the computing environment. The ontology in FIG. 7 does not imply that the term "access" 144 individually corresponds to "read" 146, "write" 148, "execute" 150. Rather, it means that the term "access" 144 corresponds to the three terms in the context of "manager" 140 and "employee data" 142. In the context of "manager" 140 and "employee data" 142 as subject and resource, respectively, the term "access" 144 maps to "read" 146 with a probability of 0.8 (152), "write" 148 with a probability of 0.18 (154), and "execute" 150 with a probability of 0.02 (156). The probability indicates the likelihood of a term mapping to another term. Once the ontology, such as the ontology in FIG. 7, has been constructed, it may then be reused for interpreting other indefinite terms in this or subsequent sentences for a security policy.

Figure 8:
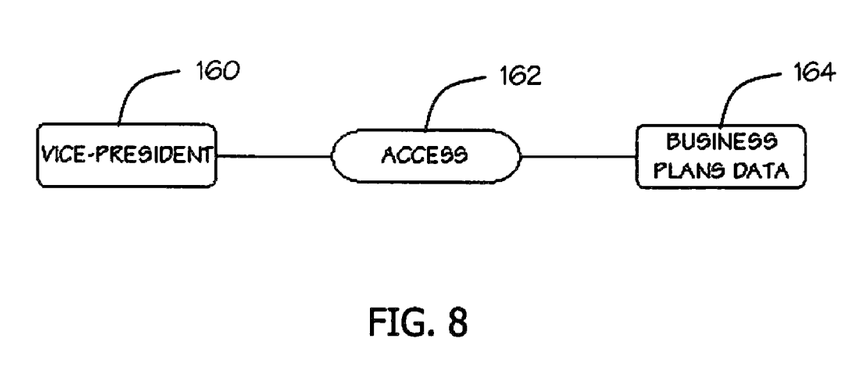
FIG. 8 is a diagram illustrating new terms to be interpreted in the process of FIG. 2.

If an ontology exists for a particular term, but not in the context of that term, the process described above may be utilized to expand the ontology for the new context. For example, suppose IT personnel is provided with the following English sentence: "Vice President can access business plans data." Similar to the previous example, this sentence may be broken down into a Subject 160, Action 162, and Resource 164 as illustrated in FIG. 8.

It is again determined that the action term 162 "access" is too broad and it does not exist in the dictionary. Thus the process described above is executed and the following two sets are returned:

R={"read", "write", "execute"}, V={100, 80, 20}

Figure 9:
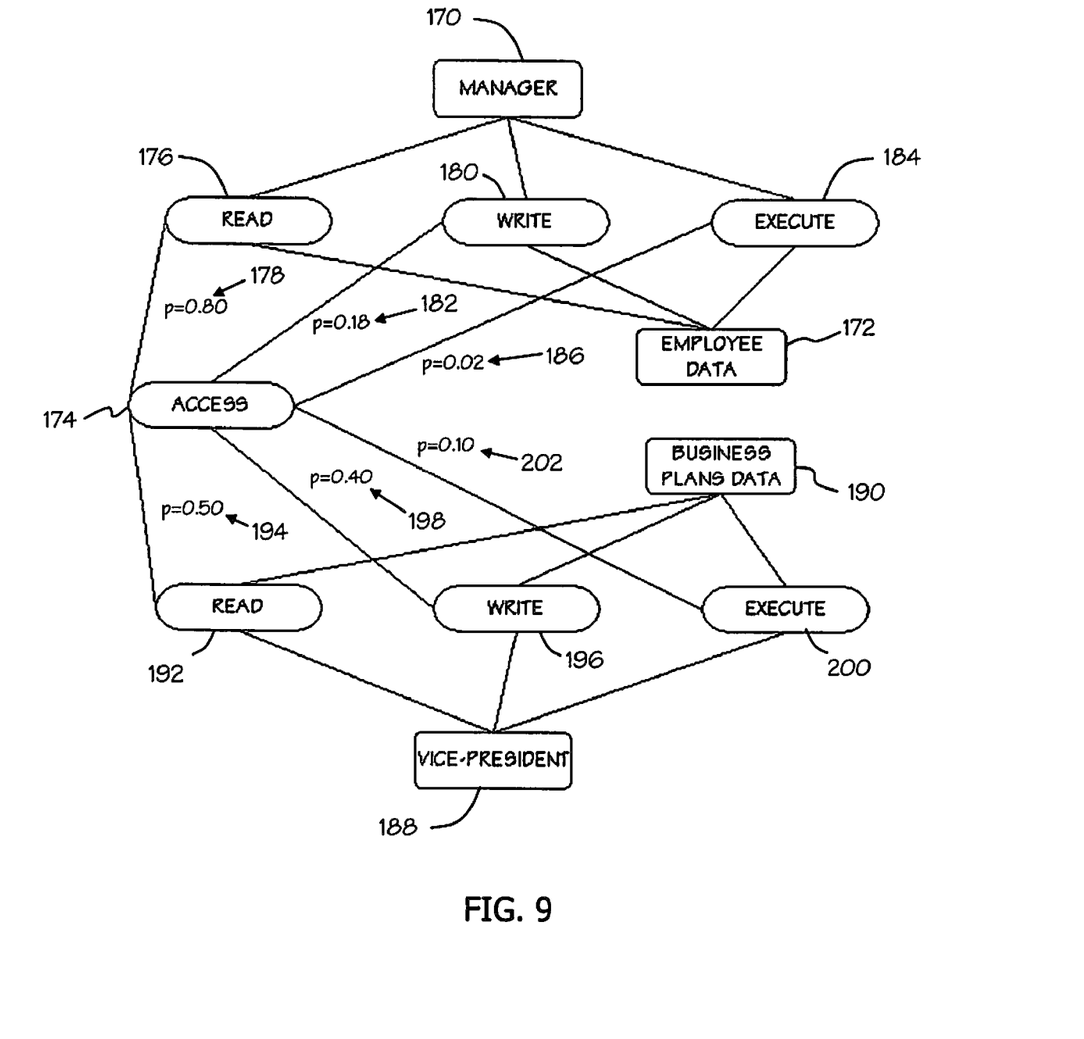
FIG. 9 is a diagram illustrating an expanded ontology of FIG. 5.

As a substitution word for the action term access, the word "read" occurs 100 times, "write" 80 times, and "execute" 20 times. Given a set of security-related hits from the Internet search, the word "read" occurs 50% of the time, "write" 40% of the time, and "execute" 10% of the time. Terms "read", "write", and "execute" are all terms that exist in the dictionary as above and the terms can be mapped directly to entities in the computing environment. Hence the ontology for "access" may be expanded as shown in FIG. 9.

This newly expanded ontology shows the following. In the context of "manager" 170 and "employee data" 172 as subject and resource, respectively, the term "access" 174 maps to "read" 176 with a probability of 0.8 (178), "write" 180 with a probability of 0.18 (182), and "execute" (184) with a probability of 0.02 (186). In the context of "Vice President" 188 and "business plans data" 190 as subject and resource, respectively, the term "access" 174 maps to "read" 192 with a probability of 0.5 (194), "write" 196 with a probability of 0.4 (198) and "execute" 200 with a probability of 0.1 (202).

By repeating the above procedure, a more comprehensive domain-specific ontology may be constructed. Because information on the Internet, and specifically the World Wide Web, is frequently updated, the construction of a domain-specific ontology such as the one illustrated in FIG. 7 or 9 may have to be performed on a regular basis to preserve the most up-to-date information in the ontology.

Once a comprehensive domain-specific ontology has been constructed, the next time the action term "access" is encountered in a given sentence, the ontology may be referenced to find one or more terms that the term "access" maps to without having to re-execute the process described above. If the term access does not exist in the ontology in a given context, then the process as described above in relation to the sentence involving the vice-president is executed and the ontology is expanded to include the new information.

The constructed ontology may be used to statistically determine the top N terms that a given foreign term may map to in a particular context. The probability values specified in the ontology may be used for that purpose. Once the terms have been selected, the appropriate measures may be taken to implement the security policy within the computing environment.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art, such as applying this technique to existing network security systems. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method for constructing a domain-specific ontology for interpreting a policy, the method comprising:
   receiving a phrase assumed to be associated with a policy, wherein the policy includes a subject term, an action term, and a resource term;
   identifying an indefinite term in the phrase by consulting a dictionary, wherein identifying the indefinite term includes identifying that the indefinite term is indefinite as a result of having different potential definitions in different contexts, and wherein the indefinite term is a subject term, an action term, or a resource term;
   performing a first Internet search on a plurality of terms from the phrase to generate first search results;
   extracting from the first search results a plurality of clues associated with potential definitions of the indefinite term;
   performing a second Internet search incorporating the plurality of clues to generate second search results;
   extracting from the second search results a plurality of potential replacement terms for the indefinite term, wherein the plurality of potential replacement terms are associated with different potential definitions of the indefinite term;
   tracking occurrences of each of the plurality of potential replacement terms in the second search results; and
   building a context-specific ontology for the indefinite term based upon the tracked occurrences of the plurality of potential replacement terms to enable the indefinite term to be replaced with different potential replacement terms in different contexts when interpreting a phrase for a policy that includes the indefinite term.

2. The method of claim 1 wherein the policy is a security policy.

3. The method of claim 1 wherein performing the first internet search comprises:
   supplying the plurality of terms from the phrase to an Internet search engine.

4. The method of claim 3 wherein the Internet search engine is a public search engine.

5. The method of claim 1 further comprising:
   restricting the first search results to a domain of interest by removing hits received from the first Internet search from the first search results that are unrelated to the domain of interest.

6. The method of claim 1 wherein the plurality of terms from the phrase includes derivatives of the terms from the phrase.

7. A program product, comprising:
   a recordable type computer readable medium; and
   a program code configured to construct a domain-specific ontology for interpreting a policy, the program code resident on the recordable type computer readable medium and configured to
   receive a phrase assumed to be associated with a policy, wherein the policy includes a subject term, an action term, and a resource term
   identify an indefinite term in the phrase by consulting a dictionary, wherein the program code is configured to identify the indefinite term by identifying that the indefinite term is indefinite as a result of having different potential definitions in different contexts, and wherein the indefinite term is a subject term, an action term, or a resource term,
   perform a first Internet search on a plurality of terms from the phrase to generate first search results,
   extract from the first search results a plurality of clues associated with potential definitions of the indefinite term,
   perform a second Internet search incorporating the plurality of clues to generate second search results,
   extract from the second search results a plurality of potential replacement terms for the indefinite term, wherein the plurality of potential replacement terms are associated with different potential definitions of the indefinite term,
   track occurrences of each of the plurality of potential replacement terms in the second search results, and
   build a context-specific ontology for the indefinite term based upon the tracked occurrences of the plurality of potential replacement terms to enable the indefinite term to be replaced with different potential replacement terms in different contexts when interpreting a phrase for a policy that includes the indefinite term.

8. The program product of claim 7 wherein the program code is configured to perform the first internet search by supplying the plurality of terms from the phrase to an Internet search engine.

9. The program product of claim 8 wherein the Internet search engine is a public search engine.

10. The program product of claim 7 wherein the program code is further configured to restrict the first search results to a domain of interest by removing hits received from the first Internet search from the first search results that are unrelated to the domain of interest.

11. The program product of claim 7 wherein the plurality of terms from the phrase includes derivatives of the terms from the phrase.

* * * * *